United States Patent Office 3,514,072
Patented May 26, 1970

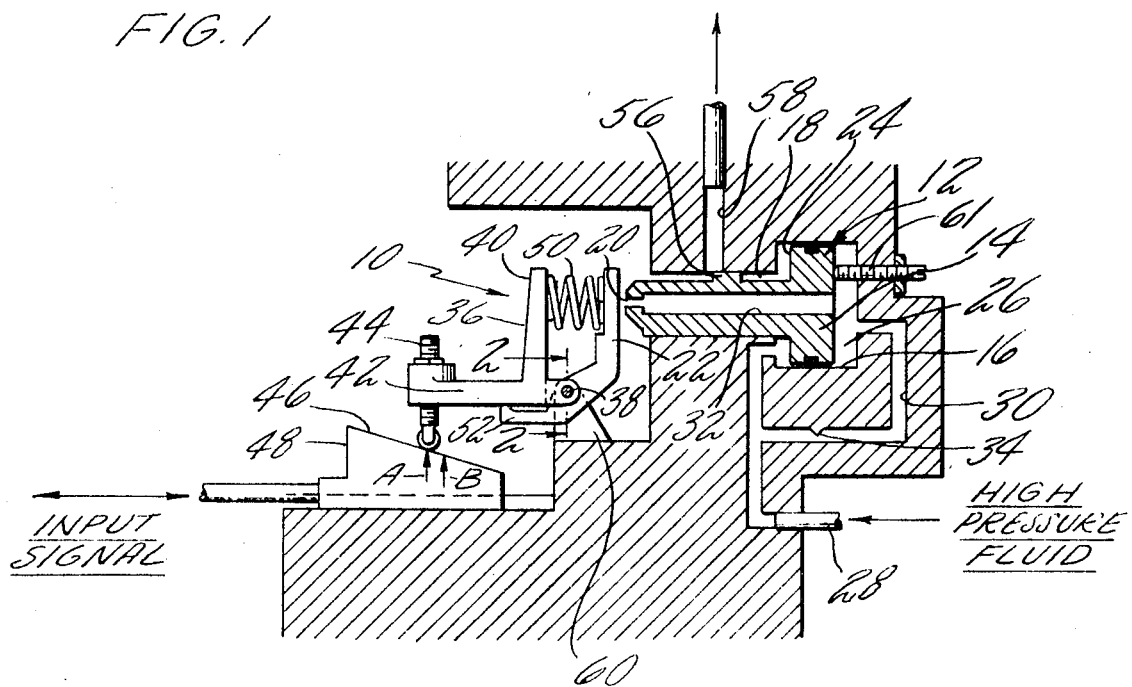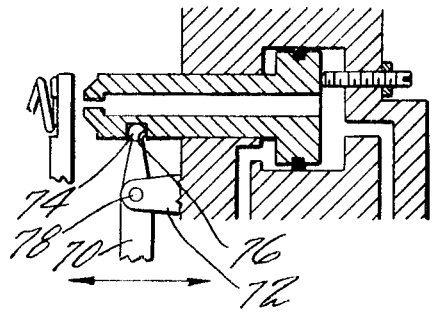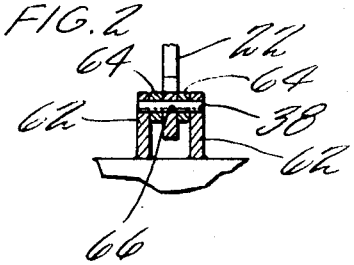

3,514,072
VALVE MEANS WITH CONTROLLED HYSTERESIS
Herbert W. Tutherly, Windsor, Conn., assignor to United Aircraft Corporation, East Hartford, Conn., a corporation of Delaware
Filed Mar. 11, 1968, Ser. No. 711,936
Int. Cl. F16k *31/38*
U.S. Cl. 251—35        2 Claims

ABSTRACT OF THE DISCLOSURE

A fluid actuated valve movable with and relative to the input lever is positioned in one direction at a given position of the input lever and in another direction at a different position of the input lever. Positive feedback is utilized to drive the valve hard over to a given position in either direction.

BACKGROUND OF THE INVENTION

This invention relates to servo valves and more particularly to a servo valve adapted to produce an on-off signal in different positions of an input control mechanism.

This invention constitutes an improvement over the mechanism disclosed and claimed in U.S. application Ser. No. 640,904 filed on May 24, 1967 by George Albert Fisher entitled "A Fluid Mechanical Hysteretic Device" and assigned to the same assignee. In this application, supra, hysteresis is effected by varying the area of a port leading fluid behind the valve spool and changing the port area as a function of the position of the valve spool. While this system may be satisfactory in certain applications, it has not proven to be satisfactory where it is desirable to assure that the servo valve produces an output signal in a positive and predictable manner. However, like the device disclosed in the above-mentioned application, this invention avoids the use of undesirable high loads which are necessary when friction and detent devices are utilized for obtaining hysteresis effect in a servo valve.

SUMMARY OF INVENTION

The primary object of the present invention is to provide an improved hysteresis servo valve.

Another object of this invention is to provide positive feedback in a hysteresis type of servo valve.

A still further object of this invention is to provide a servo valve having controlled hysteresis utilizing a two-part input lever adapted to control an integral valve and piston such that when the input lever moves to close off or open the integral valve, hydraulic fluid urges the piston to further close off or further open said valve until reaching a stop.

Other features and advantages will be apparent from the specification and claims and from the accompanying drawings which illustrate an embodiment of the invention.

BRIEF DESCRIPTION OF THE DRAWINGS

FIG. 1 is a view partially in elevation and partially in section illustrating the details of this invention.

FIG. 2 is a view taken along section 2—2 of FIG. 1, and

FIG. 3 is a view partly in elevation and partly in section illustrating another embodiment of this invention.

DESCRIPTION OF THE PREFERRED EMBODIMENT

As can be seen in FIG. 1, the hysteresis servo device is comprised of essentially a two-part input lever generally illustrated by reference numeral 10 and an integral piston and valve generally illustrated by reference numeral 12. The piston 14 of the integral piston valve 12 is suitably mounted in a cylindrical bore 16 and the valve portion is suitably mounted in a reduced diameter bore 18 having the nozzle 20 projecting therefrom and terminating adjacent lever 22. Piston 14 defines in bore 16 a pair of fluid receiving chambers 24 and 26 to which high pressure fluid is admitted through lines 28 and 30, it being noted that the fluid adjacent the lefthand side of piston 14 acts against an area which is less than the area of the piston subjected to the fluid acting on the right-hand side.

A passage 32 disposed centrally of piston 14 extends therethrough and communicates with nozzle 20. The lever 22 adjacent nozzle 20 defines a restriction for restricting the flow of fluid out of nozzle 20 and hence, varying the pressure drop across restrictor 34. In this manner the pressure in chamber 26 is controlled by the position of lever 22 relative to nozzle 20. In this embodiment the area on the left-hand side of piston 14 is half the area on the right-hand side so that by maintaining the pressure in chamber 26 at half the pressure in chamber 24, the piston will be in a null or balanced condition.

The input lever comprises bell crank member 36 pivotally connected to support 38 and carries a pair of arms 40 and 42. Follower 44 is carried by arm 42 and is urged in contact with the cam surface 46 of cam 48 by the forces of the fluid impinging on lever 22. Spring 50 interposed between arm 40 and lever 22 urges the arm 52 of lever 22 in contact with the lower surface of arm 42. Noting that arm 22 is pivotally connected at 38, movement of cam 48 in accordance with the input signal will displace arm 22 relative to nozzle 20 effectively changing the pressure in chamber 26 as was described above.

As can be seen by referring to FIG. 2 the upstanding member 60 carries a bifurcated section 62 having complementary bores for receiving pivot member 38 which may be in the form of a suitable pin. Bell crank 36 carries bifurcated section 64 also having complementary bores for receiving pivot member 38. A bore 66 formed in lever 22 aligns with the bores in bifurcated sections 62 and 64 and is also pivotally supported to pivot member 38.

The operation of this invention can best be understood by assuming that cam 48 is moved toward the right so that the cam follower now touches a higher portion. Bell crank member 36 will rotate clockwise urging arm 22 closer toward the nozzle 20. This effectively decreases the pressure drop across restrictor 34 and hence, increases the pressure in chamber 26 and when that pressure slightly exceeds the pressure that balances the forces on the small area side of the piston, the piston translates to the left which further decreases the gap between the arm 22 and nozzle 20 which, in turn, decreases the pressure drop across 34 forcing the piston to move further to the left until it eventually abuts up against arm 22 compressing spring 50 and causing lever 22 to rotate counter-clockwise about pivot 38. Piston 14 will travel until it abuts against the end of the cylindrical bore 16. Land 56 carried by the extension of piston 14 uncovers the port 58 for producing a hydraulic pressure which is transmitted to an output device (not shown).

When the cam is moved in the reverse position, the follower moves to a lower point in the cam rotating member 36 counterclockwise positioning it and hence, member 22 away from nozzle 20. This tends to increase the pressure drop across 34 and hence, reduce the pressure in chamber 26 so that the pressure acting on the left-hand side of piston 14 urges it to the right. Piston 14 travels in a positive feedback manner similar to the movement described above until the end abuts against adjustable stop 61. Obviously, the piston will be translated completely at a certain relative position of arm 22 and nozzle 20 and this gap will be substantially the same for positioning the piston in either direction. However, since the piston will be at a different position depending whether it abuts against stop 61 or the end of bore 16, the input signal likewise must have to be at a different position and the difference being accounted for by the displacement of arm 22 relative to arm 40. As noted in FIG. 1, arrow A illustrates the point where the input lever must be at to move the piston to the right (as shown) and arrow B illustrates the point where the input lever must be to move the piston to the left. Thus, it is apparent from the foregoing that the amount of deadband or hysteresis is determined by the displacement of piston 14 which can be adjusted by the adjusting of the stop member 61.

FIG. 3 illustrates another embodiment of the invention where the movement of integral piston valve 12 produces a mechanical rather than hydraulic output signal. This is achieved by connecting lever 70 to support member 72 directly to the integral piston 12. As shown, a suitable ball joint 74 is inserted in recess 76 formed in the valve portion of integral piston valve 12. Movement of piston 14 rotates lever 70 about pivot member 78.

It should be understood that the invention is not limited to the particular embodiments shown and described herein, but that various changes and modifications may be made without departing from the spirit or scope of this novel concept.

What I claim is:
1. A hysteresis servo valve having a casing,
    a combined movable valve-piston disposed in a cavity in said casing carrying a nozzle extending out of the cavity and being movable to either an opened or closed position,
    input lever means adjacent said nozzle for varying the area thereof;
    fluid passage means communicating with said nozzle,
    a restriction in said passage means,
    said piston part of said combined valve-piston defining a subchamber between said restriction and said nozzle,
    said input lever means being movable with and relative to said nozzle so that when said input lever means moves to close off said nozzle for defining a first position the pressure drop across said restriction increases the pressure in said subchamber to position said nozzle to translate said input lever to move said valve-piston to said closed position,
    said input lever means being movable to a second position spaced from said first position for causing said valve-piston to move to the opened position,
    said input lever means comprising,
    a lever member pivotally mounted in close proximity to said nozzle,
    a bell crank member having one arm parallelly spaced relative to said lever member,
    resilient means in said space abutting against said arm and said lever,
    and means for pivoting said bell crank member in response to an input signal whereby said bell crank member positions said lever member relative to said nozzle.
2. A hysteresis valve as claimed in claim 1 wherein said resilient means includes a helically wound spring.

References Cited

UNITED STATES PATENTS

| | | |
|---|---|---|
| 2,405,382 | 8/1946 | Volet. |
| 2,980,076 | 4/1961 | Machlan et al. _____ 91—49 XR |
| 3,021,865 | 2/1962 | Beckett _____ 137—82 XR |
| 3,026,851 | 3/1962 | Gallo _____ 91—49 |
| 3,052,254 | 9/1962 | Parks _____ 91—359 XR |
| 3,141,386 | 7/1964 | Loughridge _____ 92—13 XR |

FOREIGN PATENTS 719,275 12/1954 Great Britain.

ROBERT G. NILSON, Primary Examiner

U.S. Cl. X.R.

91—49, 359